United States Patent
Pleydon et al.

(10) Patent No.: US 7,478,650 B2
(45) Date of Patent: *Jan. 20, 2009

(54) INVERSION LINER AND LINER COMPONENTS FOR CONDUITS

(75) Inventors: Robert Pleydon, St. Catherines (CA); Mark Tigchelaar, Burlington (CA); Jon H. Woolstencroft, St. Catherines (CA)

(73) Assignee: Saint-Gobain Technical Fabrics Canada, Ltd., St. Catharines, Ontario (CA)

( * ) Notice: Subject to any disclaimer, the term of this patent is extended or adjusted under 35 U.S.C. 154(b) by 587 days.

This patent is subject to a terminal disclaimer.

(21) Appl. No.: 10/998,792

(22) Filed: Nov. 29, 2004

(65) Prior Publication Data

US 2005/0161100 A1    Jul. 28, 2005

Related U.S. Application Data

(63) Continuation-in-part of application No. 10/422,451, filed on Apr. 24, 2003, now Pat. No. 6,837,273, which is a continuation-in-part of application No. 10/174,580, filed on Jun. 19, 2002, now Pat. No. 7,096,890.

(51) Int. Cl.
*F16L 55/16* (2006.01)

(52) U.S. Cl. .......................... 138/98; 138/125; 138/146; 405/150.1; 405/184.3

(58) Field of Classification Search .................. 138/97, 138/98, 125, 126, 146; 405/150.1, 184.3
See application file for complete search history.

(56) References Cited

U.S. PATENT DOCUMENTS

| | | | |
|---|---|---|---|
| 130,303 A | 8/1872 | LIbby |
| 143,661 A | 10/1873 | Blake |
| 154,725 A | 9/1874 | Street |
| 268,903 A | 12/1882 | Johnson |
| 470,669 A | 3/1892 | Fitzpatrick |
| 602,301 A | 4/1898 | Bramlette |
| 614,749 A | 11/1898 | Pallas |
| 680,974 A | 8/1901 | Healey |
| 738,289 A | 9/1903 | Buckley |

(Continued)

FOREIGN PATENT DOCUMENTS

CA         987576        4/1976

(Continued)

OTHER PUBLICATIONS

"Engineered Materials Handbook," ASM International, Jan. 1998, p. 20, Introduction to Composites, definitions of reinforcement, resin and roving.

(Continued)

*Primary Examiner*—James F Hook
(74) *Attorney, Agent, or Firm*—Duane Morris LLP; Steven E. Koffs

(57) ABSTRACT

Inversion liners are provided which in a first embodiment include first and second flexible fabric layers joined to first and second high strength fiber containing layers and joined in tubular form. The first and second flexible fabric layers face one another. The second glass fiber containing layer further is bonded to a thin, third flexible fabric layer. A substantially fluid impermeable layer is applied to the opposite side of the thin, third flexible fabric layer.

36 Claims, 7 Drawing Sheets

U.S. PATENT DOCUMENTS

| | | | | |
|---|---|---|---|---|
| 1,226,023 A | 5/1917 | Smith | | |
| 1,280,909 A | 10/1918 | Wales et al. | | |
| 1,320,413 A | 11/1919 | Reznicek | | |
| 1,722,764 A | 7/1929 | Rasch | | 428/113 |
| 1,736,293 A | 11/1929 | Denburg | | |
| 2,090,851 A | 8/1937 | Perkins | | 25/38 |
| 2,175,283 A | 10/1939 | Cote | | 138/121 |
| 2,178,554 A | 11/1939 | Bowie | | 255/1 |
| 2,195,222 A | 3/1940 | Neumair | | 93/2 |
| 2,198,821 A | 4/1940 | Jessup | | 255/1 |
| 2,285,370 A | 6/1942 | Staelin | | 18/58 |
| 2,312,993 A | 3/1943 | Stephens | | 154/2 |
| 2,326,827 A | 8/1943 | Bynum | | 255/1.4 |
| 2,327,023 A | 8/1943 | Danner | | 255/1.4 |
| 2,345,766 A | 4/1944 | Miller | | 255/1.6 |
| 2,352,768 A | 7/1944 | Brend | | 91/44 |
| 2,354,399 A | 7/1944 | Noble | | 255/1.4 |
| 2,424,315 A | 7/1947 | Hyatt et al. | | 138/128 |
| 2,468,493 A | 4/1949 | Greenwald | | 138/76 |
| 2,575,353 A | 11/1951 | MacEvoy | | 25/38 |
| 2,595,408 A | 5/1952 | Quest | | 61/12 |
| 2,622,327 A | 12/1952 | Halonen | | 33/21 |
| 2,632,205 A | 3/1953 | Harris | | 18/14 |
| 2,697,585 A | 12/1954 | Chaney et al. | | 255/1.4 |
| 2,770,950 A | 11/1956 | Collins | | 61/72 |
| 2,794,758 A | 6/1957 | Harper et al. | | 154/82 |
| 2,848,151 A | 8/1958 | O'Neil | | 138/125 |
| 2,910,042 A | 10/1959 | Gallmeyer et al. | | 118/105 |
| 2,987,768 A | 6/1961 | Given | | 18/14 |
| 3,028,284 A | 4/1962 | Reeves | | 156/213 |
| 3,037,228 A | 6/1962 | Cummings | | 15/104.1 |
| 3,044,146 A | 7/1962 | Thomas et al. | | 28/78 |
| 3,061,496 A | 10/1962 | Meyer | | 156/26 |
| 3,080,269 A | 3/1963 | Pollock et al. | | 156/87 |
| 3,122,786 A | 3/1964 | Huisman | | 18/5 |
| 3,132,062 A | 5/1964 | Lang et al. | | 156/287 |
| 3,175,392 A | 3/1965 | Tharalson | | 73/84 |
| 3,179,551 A | 4/1965 | Dudas | | 161/116 |
| 3,214,289 A | 10/1965 | Lefebvre et al. | | 117/122 |
| 3,246,621 A | 4/1966 | Copeland | | 156/93 |
| 3,261,374 A | 7/1966 | Anderson et al. | | 138/97 |
| 3,333,311 A | 8/1967 | Matheny et al. | | 25/38 |
| 3,340,115 A | 9/1967 | Rubenstein | | 156/86 |
| 3,376,180 A | 4/1968 | Larson et al. | | 156/195 |
| 3,376,181 A | 4/1968 | Larson et al. | | 156/203 |
| 3,494,813 A | 2/1970 | Lawrence et al. | | 156/287 |
| 3,511,734 A | 5/1970 | Darrow | | 156/287 |
| 3,560,295 A | 2/1971 | Kimbrell et al. | | 156/287 |
| 3,583,169 A | 6/1971 | Morgan | | 61/72.3 |
| 3,603,096 A | 9/1971 | Wells | | 61/0.5 |
| 3,666,586 A | 5/1972 | Lacey | | 156/98 |
| 3,720,557 A | 3/1973 | Longoni et al. | | 156/156 |
| 3,742,985 A | 7/1973 | Rubenstein | | 138/141 |
| 3,753,766 A | 8/1973 | Brown et al. | | 117/97 |
| 3,784,441 A | 1/1974 | Kaempen | | 161/58 |
| 3,834,421 A | 9/1974 | Daley | | 138/97 |
| 3,851,786 A | 12/1974 | Kaempen | | 220/3 |
| 3,891,489 A | 6/1975 | Bordner et al. | | 156/171 |
| 3,893,878 A | 7/1975 | Kaempen | | 156/161 |
| 3,895,604 A | 7/1975 | Ryan | | 118/306 |
| 3,915,776 A | 10/1975 | Kaempen | | 156/161 |
| 3,927,464 A | 12/1975 | Wallsten | | 29/454 |
| 3,940,942 A | 3/1976 | Gower | | 61/72.3 |
| 3,957,416 A | 5/1976 | Kaempen | | 425/470 |
| 3,996,967 A | 12/1976 | Takada | | 138/97 |
| 4,009,063 A | 2/1977 | Wood | | 156/71 |
| 4,064,211 A | 12/1977 | Wood | | 264/95 |
| 4,081,303 A | 3/1978 | Rogers et al. | | 156/192 |
| 4,127,430 A | 11/1978 | Davis | | 156/244.14 |
| 4,135,958 A | 1/1979 | Wood | | 156/199 |
| 4,182,262 A | 1/1980 | Everson et al. | | 118/44 |
| 4,197,908 A | 4/1980 | Davis et al. | | 166/55 |
| 4,207,130 A | 6/1980 | Barber | | 156/244.13 |
| 4,227,957 A | 10/1980 | Keuchel et al. | | 156/443 |
| 4,233,101 A | 11/1980 | Scragg et al. | | 156/287 |
| 4,243,075 A | 1/1981 | McPherson et al. | | 138/174 |
| 4,247,345 A | 1/1981 | Kadija et al. | | 156/73.4 |
| 4,283,457 A | 8/1981 | Kolsky et al. | | 428/285 |
| 4,308,824 A | 1/1982 | Muta et al. | | 118/713 |
| 4,327,132 A | 4/1982 | Shinno | | 427/235 |
| 4,329,937 A | 5/1982 | Holland | | 118/105 |
| 4,350,548 A | 9/1982 | Zenbayashi et al. | | 156/156 |
| 4,351,364 A | 9/1982 | Cocks | | 138/133 |
| 4,361,451 A | 11/1982 | Renaud | | 156/64 |
| 4,366,012 A | 12/1982 | Wood | | 156/93 |
| 4,371,569 A | 2/1983 | Muta et al. | | 138/137 |
| 4,373,554 A | 2/1983 | Cook | | 138/137 |
| 4,385,885 A | 5/1983 | Wood | | 425/387.1 |
| 4,386,628 A | 6/1983 | Stanley | | 138/97 |
| 4,390,574 A | 6/1983 | Wood | | 428/36 |
| 4,401,696 A | 8/1983 | Wood | | 427/236 |
| 4,419,163 A | 12/1983 | Yamamoto et al. | | 156/94 |
| 4,434,115 A | 2/1984 | Chick | | 264/36 |
| 4,439,469 A | 3/1984 | Wood | | 427/230 |
| 4,442,891 A | 4/1984 | Wood | | 166/55.2 |
| 4,443,498 A | 4/1984 | Shinno | | 427/235 |
| 4,446,181 A | 5/1984 | Wood | | 428/36.1 |
| 4,456,401 A | 6/1984 | Williams | | 405/150 |
| 4,478,661 A | 10/1984 | Lewis | | 138/125 X |
| 4,484,602 A | 11/1984 | Guthrie | | 138/93 |
| 4,491,617 A | 1/1985 | O'Connor et al. | | 428/236 |
| 4,492,095 A | 1/1985 | Brister | | 62/293 |
| 4,496,499 A | 1/1985 | Brittain et al. | | 264/36 |
| 4,505,613 A | 3/1985 | Koga | | 405/154 |
| 4,508,582 A | 4/1985 | Fink | | 156/93 |
| 4,529,008 A | 7/1985 | Appleton | | 138/97 |
| 4,539,250 A | 9/1985 | Fujii et al. | | 428/195 |
| 4,548,783 A | 10/1985 | Dalke et al. | | 376/204 |
| 4,568,581 A | 2/1986 | Peoples, Jr. | | 428/35 |
| 4,576,858 A | 3/1986 | Fourezon | | 428/300 |
| 4,577,388 A | 3/1986 | Wood | | 29/558 |
| 4,581,085 A | 4/1986 | Wood | | 156/156 |
| 4,581,247 A | 4/1986 | Wood | | 427/53.1 |
| 4,585,033 A | 4/1986 | Westman | | 138/89 |
| 4,593,721 A | 6/1986 | Klenk et al. | | 138/118.1 |
| 4,600,615 A | 7/1986 | Hyodo et al. | | 428/36 |
| 4,602,974 A | 7/1986 | Wood et al. | | 156/287 |
| 4,604,152 A | 8/1986 | Liukko | | 156/93 |
| 4,622,196 A | 11/1986 | Wood | | 264/229 |
| 4,625,766 A | 12/1986 | Dohlen et al. | | 138/93 |
| 4,626,133 A | 12/1986 | Waring | | 405/107 |
| 4,630,676 A | 12/1986 | Long, Jr. | | 166/55 |
| 4,637,588 A | 1/1987 | Wilhelm et al. | | 251/280 |
| 4,637,754 A | 1/1987 | Wood | | 405/150 |
| 4,640,313 A | 2/1987 | Stanley | | 138/141 |
| 4,649,004 A | 3/1987 | Nohara et al. | | 264/85 |
| 4,655,638 A | 4/1987 | Waring | | 405/107 |
| 4,668,125 A | 5/1987 | Long, Jr. | | 405/154 |
| 4,670,315 A | 6/1987 | Hillemeier et al. | | 428/36 |
| 4,672,832 A | 6/1987 | Merker | | 72/62 |
| 4,677,472 A | 6/1987 | Wood | | 358/100 |
| 4,678,699 A | 7/1987 | Kritchevsky et al. | | 428/175 |
| 4,680,066 A | 7/1987 | Wood | | 156/156 |
| 4,681,783 A | 7/1987 | Hyodo et al. | | 428/36 |
| 4,684,419 A | 8/1987 | Agosta | | 156/93 |
| 4,684,556 A | 8/1987 | Ohtsuga et al. | | 428/36 |
| 4,685,983 A | 8/1987 | Long, Jr. | | 156/64 |
| 4,701,988 A | 10/1987 | Wood | | 29/33 T |
| 4,710,337 A | 12/1987 | Nordström | | 264/508 |
| 4,723,579 A | 2/1988 | Hyodo et al. | | 138/124 |
| 4,733,699 A | 3/1988 | Hata | | 138/145 |
| 4,738,565 A | 4/1988 | Streatfield et al. | | 405/154 |
| 4,752,431 A | 6/1988 | Knowles | | 264/512 |
| 4,752,511 A | 6/1988 | Driver | | 428/36 |

| | | | | | | | |
|---|---|---|---|---|---|---|---|
| 4,754,781 A | 7/1988 | Jan de Putter | 138/98 | 5,286,144 A | 2/1994 | Griner | 408/224 |
| 4,758,454 A | 7/1988 | Wood | 428/36 | 5,307,608 A | 5/1994 | Muir et al. | 53/440 |
| 4,759,656 A | 7/1988 | Wilson | 404/26 | 5,309,947 A | 5/1994 | Hinger | 138/98 |
| 4,768,562 A | 9/1988 | Strand | 138/98 | 5,322,653 A | 6/1994 | Muller | 264/35 |
| 4,770,562 A | 9/1988 | Müller et al. | 405/154 | 5,329,063 A | 7/1994 | Endoh | 138/98 |
| 4,773,450 A | 9/1988 | Stanley | 138/98 | 5,334,429 A | 8/1994 | Imoto et al. | 138/98 X |
| 4,776,370 A | 10/1988 | Long, Jr. | 138/98 | 5,337,823 A | 8/1994 | Nobileau | 166/277 |
| 4,777,984 A | 10/1988 | Storah | 138/98 | 5,340,524 A | 8/1994 | McMillan et al. | 264/229 |
| 4,778,553 A | 10/1988 | Wood | 156/287 | 5,374,174 A | 12/1994 | Long, Jr. | 425/11 |
| 4,786,345 A | 11/1988 | Wood | 156/156 | 5,397,513 A | 3/1995 | Steketee, Jr. | 264/36 |
| 4,790,975 A | 12/1988 | Järvenkylä et al. | 264/508 | 5,409,561 A | 4/1995 | Wood | 156/287 |
| 4,808,098 A | 2/1989 | Chan et al. | 425/72.1 | 5,411,060 A | 5/1995 | Chandler | 138/98 |
| 4,810,453 A | 3/1989 | Clarke et al. | 264/269 | 5,445,875 A | 8/1995 | Persson | 428/228 |
| 4,819,721 A | 4/1989 | Long, Jr. | 166/55 | 5,451,351 A | 9/1995 | Blackmore | 264/449 |
| 4,836,715 A | 6/1989 | Wood | 405/150 | 5,535,786 A | 7/1996 | Mäkelä et al. | 138/98 |
| 4,851,274 A | 7/1989 | D'Elia | 428/113 | 5,653,555 A | 8/1997 | Catallo | 405/154 |
| 4,867,921 A | 9/1989 | Steketee, Jr. | 264/36 | 5,680,885 A | 10/1997 | Catallo | 138/98 |
| 4,871,413 A | 10/1989 | Hyodo et al. | 156/382 | 5,698,056 A | 12/1997 | Kamiyama et al. | 156/218 |
| 4,877,665 A | 10/1989 | Higuchi et al. | 428/36.1 | 5,798,013 A | 8/1998 | Brandenburger | 156/188 |
| 4,883,557 A | 11/1989 | Morinaga et al. | 156/287 | 5,836,357 A | 11/1998 | Kittson et al. | 138/98 |
| 4,892,774 A | 1/1990 | Vallance | 428/174 | 5,868,169 A | 2/1999 | Catallo | 138/98 |
| 4,897,135 A | 1/1990 | Aylor, Jr. et al. | 156/94 | 5,873,391 A | 2/1999 | Kittson et al. | 138/98 |
| 4,901,424 A | 2/1990 | Menendez | 29/451 | 5,911,246 A | 6/1999 | Kittson et al. | 138/98 |
| 4,907,624 A | 3/1990 | Jonasson | 138/125 | 5,931,199 A | 8/1999 | Kittson et al. | 138/98 |
| 4,925,381 A | 5/1990 | Aoki et al. | 425/145 | 5,993,114 A | 11/1999 | Jones | 405/150.1 |
| 4,927,684 A | 5/1990 | Asensio et al. | 428/91 | 6,018,914 A | 2/2000 | Kamiyama et al. | 52/20 |
| 4,933,134 A | 6/1990 | Jarvenkyla | 264/508 | 6,042,668 A | 3/2000 | Kamiyama et al. | 156/93 |
| 4,950,356 A | 8/1990 | Grace | 156/259 | 6,170,531 B1 | 1/2001 | Jung et al. | 138/98 |
| 4,950,446 A | 8/1990 | Kinumoto et al. | 214/516 | 6,196,271 B1 | 3/2001 | Braun et al. | 138/98 |
| 4,956,038 A | 9/1990 | Morinaga et al. | 156/156 | 6,228,312 B1 | 5/2001 | Boyce | 264/458 |
| 4,959,110 A | 9/1990 | Russell | 156/187 | 6,254,709 B1 | 7/2001 | Kamiyama et al. | 156/91 |
| 4,972,880 A | 11/1990 | Strand | 138/98 | 6,360,780 B1 | 3/2002 | Adolphs et al. | 138/98 |
| 4,976,290 A | 12/1990 | Gelin et al. | 138/141 | 6,615,875 B2 | 9/2003 | Adolphs et al. | |
| 4,980,116 A | 12/1990 | Driver | 264/516 | 6,708,729 B1 | 3/2004 | Smith | 138/98 |
| 4,985,196 A | 1/1991 | LeDoux et al. | 264/516 | 6,837,273 B2 | 1/2005 | Woolstencroft et al. | 138/98 |
| 4,986,951 A | 1/1991 | Ledoux et al. | 264/516 | 2005/0028880 A1 | 2/2005 | Smith | 138/98 |
| 4,991,006 A | 2/1991 | Wood | 358/100 | 2005/0028881 A1 | 2/2005 | Smith et al. | 138/98 |
| 4,995,761 A | 2/1991 | Barton | 405/154 | | | | |
| 5,010,440 A | 4/1991 | Endo | 361/215 | | | | |

FOREIGN PATENT DOCUMENTS

| | | |
|---|---|---|
| CA | 1134290 | 10/1982 |
| CA | 1195128 | 10/1985 |
| CA | 1217416 | 2/1987 |
| CA | 1250737 | 3/1989 |
| CA | 1271115 | 7/1990 |
| CA | 2024027 | 5/2001 |
| DE | 99643 A | 4/1897 |
| DE | 2810991 A1 | 2/1980 |
| DE | 33 39 305 C2 | 8/1987 |
| DE | 3614963 A1 | 10/1987 |
| DE | 37 16 476 C1 | 12/1987 |
| DE | 3627556 A1 | 2/1988 |
| DE | 38 19 657 C1 | 7/1989 |
| DE | 33 05 348 C2 | 1/1990 |
| DE | 3910607 A1 | 10/1990 |
| DE | 3931775 A1 | 4/1991 |
| DE | 4031741 A1 | 6/1991 |
| DE | 41 03 980 C1 | 8/1992 |
| EP | 0155406 A2 | 9/1985 |
| EP | 0 256 140 A1 | 2/1988 |
| EP | 0 275 060 A1 | 7/1988 |
| EP | 0168053 A1 | 7/1988 |
| EP | 0275924 A2 | 7/1988 |
| EP | 0391270 A1 | 10/1990 |
| EP | 0 403 133 A2 | 12/1990 |
| FR | 1150981 A | 1/1958 |
| FR | 2579294 A1 | 9/1986 |
| GB | 635096 A | 4/1950 |
| GB | 989870 A | 4/1965 |
| GB | 1039836 A | 8/1966 |
| GB | 1340068 A | 12/1973 |
| GB | 1357355 A | 6/1974 |
| GB | 1423819 A | 2/1976 |

| | | | |
|---|---|---|---|
| 5,018,545 A | 5/1991 | Wells | 134/113 |
| 5,019,417 A | 5/1991 | Northcutt | 427/54.1 |
| 5,027,895 A | 7/1991 | Barton | 166/186 |
| 5,029,615 A | 7/1991 | Muller et al. | 138/98 |
| 5,030,493 A | 7/1991 | Rich | 428/63 |
| 5,044,405 A | 9/1991 | Driver et al. | 138/98 |
| 5,044,824 A | 9/1991 | Long, Jr. et al. | 405/156 |
| 5,049,003 A | 9/1991 | Barton | 405/154 |
| 5,068,940 A | 12/1991 | Sheppard et al. | 15/104.31 |
| 5,077,107 A | 12/1991 | Kaneda et al. | 428/36.1 |
| 5,099,911 A | 3/1992 | Vowles | 165/95 |
| 5,104,595 A | 4/1992 | Hunter | 264/33 |
| 5,106,440 A | 4/1992 | Tangeman | 156/94 |
| 5,108,533 A | 4/1992 | Long, Jr. et al. | 156/294 |
| 5,112,211 A * | 5/1992 | LeDoux et al. | 425/384 |
| 5,122,193 A | 6/1992 | Derlein | 134/22.11 |
| 5,143,244 A | 9/1992 | Kauffman | 220/445 |
| 5,150,989 A | 9/1992 | Long, Jr. et al. | 405/303 |
| 5,154,936 A | 10/1992 | Driver et al. | 425/182 |
| 5,163,481 A | 11/1992 | Catallo | 138/98 |
| 5,172,730 A | 12/1992 | Driver | 138/104 |
| 5,186,215 A | 2/1993 | Gilleland | 138/98 |
| 5,205,886 A | 4/1993 | White | 156/71 |
| 5,213,727 A | 5/1993 | Gargiulo | 264/40.3 |
| 5,225,121 A | 7/1993 | Yokoshima | 264/36 |
| 5,230,842 A | 7/1993 | Munde | 264/34 |
| 5,241,993 A | 9/1993 | Stephens | 138/98 |
| 5,246,641 A | 9/1993 | Perkins et al. | 264/35 |
| 5,265,648 A | 11/1993 | Lyon | 138/98 |
| 5,265,671 A | 11/1993 | Vowles | 165/95 |
| 5,265,981 A | 11/1993 | McNeil | 405/303 |
| 5,271,433 A | 12/1993 | Schwert et al. | 138/98 |
| 5,280,811 A | 1/1994 | Catallo | 138/98 |
| 5,285,741 A | 2/1994 | Askin | 112/262.2 |

| | | | | | | |
|---|---|---|---|---|---|---|
| GB | 1449455 | A | 9/1976 | WO | WO 92/15817 | 9/1992 |
| GB | 2133497 | A | 7/1984 | | | |
| GB | 2218773 | A | 11/1989 | | | |
| JP | 58208014 | A | 12/1983 | | | |
| JP | HEI63-5921 | | 11/1988 | | | |
| WO | WO 83/03131 | | 9/1983 | | | |

OTHER PUBLICATIONS

European Search Report dated Jan. 16, 2001.
International Search Report dated Sep. 22, 2003.

* cited by examiner

INVERSION LINER AND LINER COMPONENTS FOR CONDUITS

This application is a continuation-in-part of U.S. patent application Ser. No. 10/422,451, filed Apr. 24, 2003 now U.S. Pat. No. 6,837,273, which is a continuation-in-part application of U.S. patent application Ser. No. 10/174,580, filed Jun. 19, 2002 now U.S. Pat. No. 7,096,890, entitled "Inversion Liner and Liner Components for Conduits" filed Jun. 19, 2002, and is related to commonly assigned U.S. Pat. Nos. 5,836,357; 5,931,199; 5,911,246 and 5,873,391, which are all hereby incorporated by reference herein in their entireties.

FIELD OF THE INVENTION

This invention relates to conduit liners for making repairs in underground piping systems, and more particularly, to inversion liners that provide improved strength and greater inversion speed.

BACKGROUND OF THE INVENTION

Underground piping systems are essential in providing the transportation of liquids and gases to homes and businesses. Used mostly by utilities in sewer pipes, water pipes, water mains, gas mains, electrical conduits and other applications, such pipes are often found many feet under ground or in inaccessible areas, such as under buildings or roadways.

Due to cyclical loadings, premature wear, manufacturing defects, corrosion, and other factors, these pipes can often develop cracks or weakened areas requiring repair. Since the replacement of underground pipes is extremely costly, an alternative is to provide a lining repair while leaving the remaining pipe structure in place. Various types of lining products have been commercialized in the past, some flexible, some rigid and some flexible when applied, but rendered rigid by a resin after application. In most cases, it is highly desirable to closely conform the lining to the inner surface of the pipe. This has been generally accomplished by pressure-expandable techniques and inversion techniques.

In a "pressure-expandable" technique (also called the "winch-in-place" technique), a pliable polyester felt sleeve, which has been previously impregnated with a thermosetting resin is inserted into a damaged pipe portion and pressurized so that the resin-impregnated liner presses firmly against the inner wall of the damaged pipe. The expanded liner is then permitted to cure to form a new lining within the original pipe. More recently, pressure-expandable conduit liners have been introduced with glass reinforcement dispersed along the inner and outer surfaces of the liner. See Kittson, et al., U.S. Pat. No. 5,836,357, which is hereby incorporated by reference.

In the "inversion" technique, the pipe liner is first impregnated with a suitable curable synthetic resin. The resin-filled liner is next inserted into a pipe. The leading end of the liner is turned back onto itself and fixed to the lower end of a feed elbow of a manhole. A fluid, such as water or air, is pumped into the feed elbow which causes the liner to invert into and along the interior of the pipe. The liner is maintained in engagement with the pipe until the resin cures. After the resin cure has been completed, the fluid is drained from the inside of the liner, thus leaving a hard, rigid lining applied to the pipe's inner surface.

Most inversion liners are formed of heavily needled felt of polyester or acrylic fibers. Needling causes the fibers to generally extend in right angles to the plane of the material.

Efforts to improve upon the mechanical properties of felt liners have included flowing chopped glass fibers onto the felt web prior to needling, Wood, U.S. Pat. No. 4,390,574, or needling the felt with reinforcing fibers, such as carbon fibers, Kevlar® fibers or high tenacity polypropylene fibers, such as disclosed in Wood, U.S. Pat. No. 4,836,715. Other techniques include the use of glass fiber cloth, mat or felt, or a non-woven felt of a mixture of synthetic and glass fibers, such as disclosed in Kamiyamma, et al., U.S. Pat. No. 6,018,914.

The introduction of glass or other high strength fibers in needling operations, while increasing the average tensile strength of the fibers themselves, still presents a less than desirable orientation, since the needled reinforcing fibers are also generally disposed at right angles to the plane of the material.

Kittson, et al., U.S. Pat. No. 5,836,357, shown in FIG. 2, teaches the use of glass roving in conjunction with chopped glass fibers for improving the tensile strength in at least the longitudinal direction of the liner. The Kittson et al. liner is "glass-faced", being formed by a pair of glass fiber layers 2 and 3 stitched with a thread to a pair of felt layers 4 and 5, and sewn together in a tubular form. While this dramatically improves the liner's mechanical properties, this liner has not been recommended for inversion techniques, and was designed for winch-in-place applications. The Kittson, et al. liner is also difficult to "build", as in the subsequent building-up of additional liner layers or "blocks" due to the fact that glass layers are not "heat bondable" through conventional means. In addition, a separate impermeable foil or film must be added to contain pressure for expansion of this liner by heated fluids. Moreover, artisans have generally regarded building up layers of liners within an underground pipe to be impractical.

Accordingly, there remains a need for an inversion liner that can optionally be built up, such as by heat bonding or by adhesive bonding, for example, with several liner layers for large diameter pipe and manhole applications. There further remains a need for a reinforced inversion liner material, suitable for small and large conduits alike, which can be made thicker by layering a number of simple building blocks, preferably without significantly affecting the overall modulus of the liner.

SUMMARY OF THE INVENTION

In some embodiments, a method of making a tubular inversion liner or liner block comprises providing a first flexible fabric layer fastened to a first high strength fiber containing layer; providing a second flexible fabric layer fastened to a second high strength fiber containing layer; combining the first and second flexible fabric layers and the first and second high strength fiber containing layers by melt bonding or adhesion without stitching or needling, so that the first and second flexible fabric layers face one another, and are sandwiched between the first and second high strength fiber containing layers; and providing a substantially fluid impermeable layer on the second high strength fiber containing layer, the substantially fluid impermeable layer becoming the outermost layer prior to inversion.

In some embodiments, a pressure-expandable tubular liner for conduits, including at least one liner block, comprises a first flexible fabric layer fastened to a first high strength fiber containing layer. A second flexible fabric layer is fastened to a second high strength fiber containing layer. The first and second flexible fabric layers and the first and second high strength fiber containing layers fastened are together by melt bonding or adhesion without stitching or needling whereby the first and second flexible fabric layers face one another and are sandwiched between the first and second fiber containing layers. A a substantially fluid impermeable layer is joined to at least one of the high strength fiber containing layers.

In some embodiments, a pressure-expandable tubular liner for conduits, comprises a first flexible fabric layer fastened to a first high strength fiber containing layer and a second flexible fabric layer fastened to a second high strength fiber containing layer. One or more additional flexible fabric layers, are each joined to one of the group consisting of the first flexible fabric layer, the second flexible fabric layer, and another of the one or more additional flexible fabric layers by melt bonding or adhesion without stitching or needling whereby the one or more additional flexible fabric layers are sandwiched between the first and second fiber containing layers. A substantially fluid impermeable layer is joined to at least one of the first and second high strength fiber containing layers.

BRIEF DESCRIPTION OF THE DRAWINGS

The accompanying drawings illustrate preferred embodiments of the invention according to the practical application of the principles thereof and in which.

DETAILED DESCRIPTION OF THE PREFERRED EMBODIMENT

Figure 1:
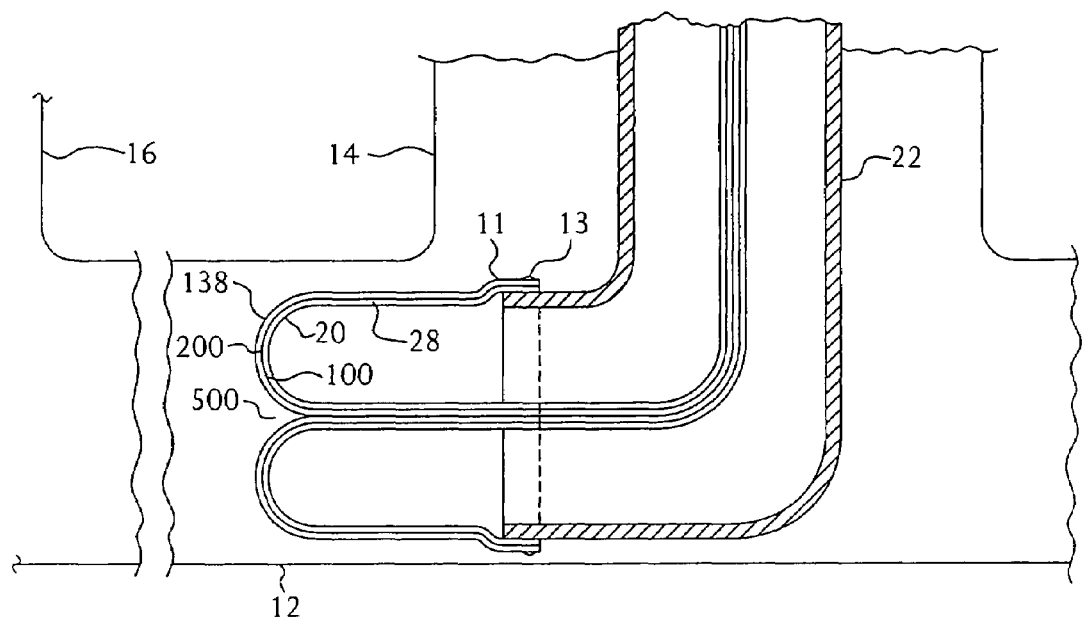
FIG. 1: is a diagrammatic cross-sectional view illustrating a preferred double-block inversion liner of this invention disposed within a pipe.
Figure 2:
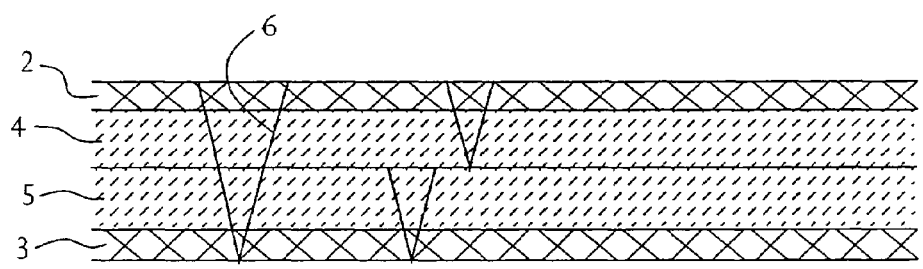
FIG. 2: is an enlarged cross-sectional view of a segment of a typical prior art lining having a glass-faced construction.

In a first embodiment, the present invention provides a method for making a tubular inversion liner, or liner block. This method includes the steps of providing first and second flexible fabric layers fastened to first and second high strength reinforcing fiber containing layers (e.g., glass-containing layers), respectively, followed by combining the first and second flexible fabric layers and the first and second high strength reinforcing fiber containing layers so that the first and second flexible fabric layers are sandwiched between the first and second high strength reinforcing fiber containing layers. The method further includes the step of joining a third flexible fabric layer, which is much thinner than the first and second flexible fabric layers, to the first or second high strength reinforcing fiber containing layer. Finally, a substantially fluid impermeable layer is applied to the third flexible fabric layer such that the impermeable layer becomes the outermost layer of the liner, or liner block prior to inversion.

One embodiment of the present invention provides a more efficient construction method than those previously provided in the inversion liner field. By stitching, gluing or heat bonding a thin veil, having a thickness of about 0.1 to about 1.0 mm, to the second high strength containing layer, and applying an integral fluid impermeable layer on the veil, a tubular inversion liner can be manufactured with a reduced number of layers, which makes the inversion liner easier to invert, lighter to carry and cheaper to manufacture.

In a further embodiment of this invention, a method of manufacturing a tubular inversion liner, or liner block, is provided which includes the steps of providing first and second flexible nonwoven polyester fabric layers, each of which is fastened to a high strength fiber containing layer. The method further includes stitching, or otherwise attaching, a nonwoven spun-bonded polyester veil, together with the first and second flexible nonwoven polyester fabric layers and the first and second high strength fiber containing layers, whereby the veil is attached to the second high strength fiber containing layer, followed by joining a substantially fluid impermeable layer to the nonwoven polyester veil. The substantially fluid impermeable layer then becomes the outermost layer of the liner, or liner block, prior to inversion, and becomes the innermost layer after inversion.

An embodiment of the present invention is related to inversion liners of the type that can be inverted with the assistance of fluid pressure, such as compressed air, steam or hot water (hereinafter "fluids") to expand within a defective conduit and generally, mechanically mate or bond within, or come in close proximity to, the inner diameter of the conduit prior to curing to form a substantially corrosion and water resistant sleeve. As such, the liners of this invention are thin, tubular members which can exhibit a tubular, tape-like or ribbon-like cross-section prior to inversion. As used herein, the term "buildable" refers to the ability of the liners of this invention to be adhesively bonded to a second or subsequent liner block to build up the thickness of the liner to its final thickness, and the term "glass-faced" means a liner having at least one glass layer located on, or proximate to, its face or faces. Building techniques for liner materials are often useful for large pipes of 36-40 inches or greater in diameter, in which liner building blocks of about 4 to about 14 mm are added together to build up to a thickness of about 12 to about 50 mm in final thickness, for example. This building can be done whenever the tube is assembled, by the manufacturer or installer, for example, preferably before inversion or installation. Alternatively, the liners according to some embodiments of this invention can be made with thicker layers or more layers of fabric disposed between two high strength fiber-containing layers (e.g., glass fiber containing layers), which in turn can be made thicker, to achieve final product thickness. The liners described herein provide high flexural modulus and strength but are still vibration and corrosion resistant.

With reference to the drawings, and particularly FIGS. 1 and 3 through 7B thereof, there is shown preferred inversion liners 300, 500, and 600 or liner blocks 100, 200, 400 and 850. For example, liner block 100, shown in FIG. 3, contains first and second flexible fabric layers 18 and 28 which are adhesively, mechanically and/or heat bonded to one or more high strength fiber containing layers (e.g., glass fiber containing layers) 24 and 34. This is accomplished, for example, by stitch thread 33 sewn to bond the fabric layer 18 to the glass fiber containing layer 24, and the flexible fabric layer 28 to the glass fiber-containing layer 34, followed by stitching all of these layers 28, 38, 24 and 18 together. The resulting liner block 100 includes one or more longitudinal seam portions, preferably an outer seam portion and an inner seam portion which are preferably not radially aligned so as to avoid a continuous radial discontinuity through the wall thickness of liner block 100, as described in Kittson et al., U.S. Pat. No. 5,836,357.

Figure 3:
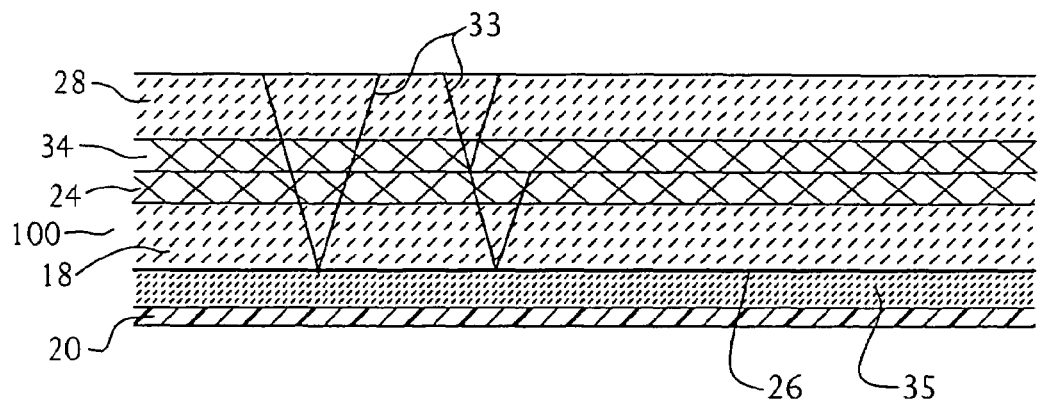
FIG. 3: is an enlarged cross-sectional view of a segment of a preferred liner of this invention.
Figure 5:
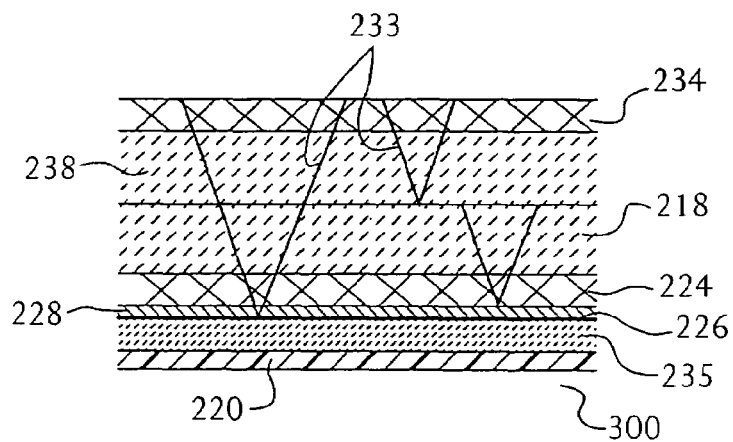
FIG. 5: is an enlarged cross-sectional view of a segment of an improved glass-faced liner of this invention.
Figure 7A:
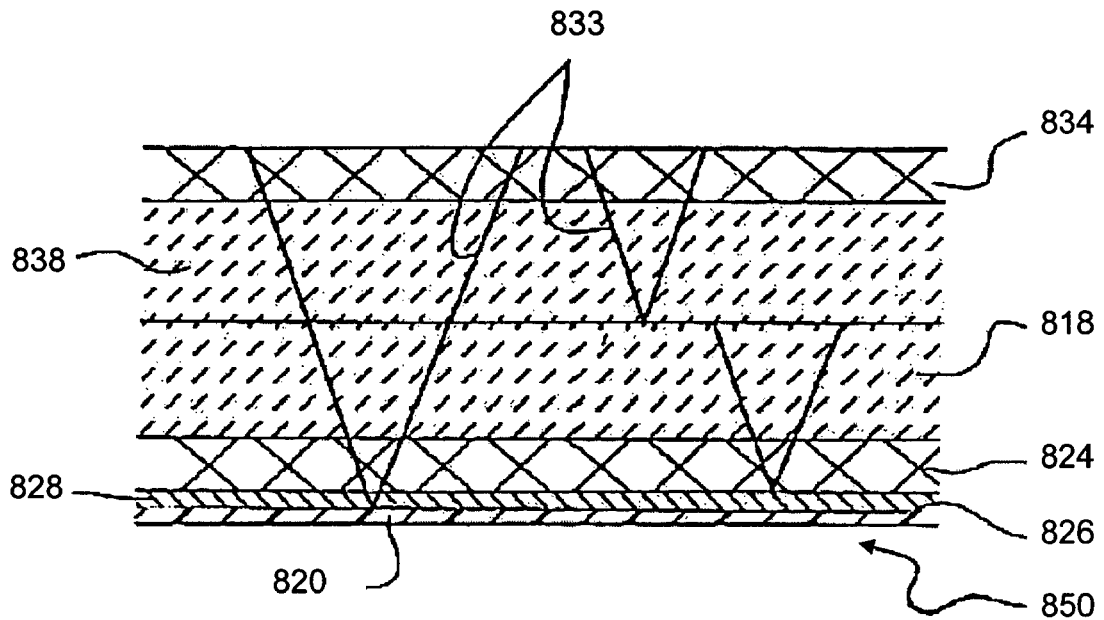
FIG. 7A: is an enlarged cross sectional view of a segment of a liner or liner block having a thin veil coated with a liquid impermeable layer.

In the embodiment of FIG. 3, glass-faced needled felt is manufactured in blankets by disposing chopped glass and/or glass roving onto a moving felt. The glass fibers are stitched or sewn onto each of the flexible fabric layers 18 and 28 separately, thus forming, in the preferred embodiment, individual glass containing layers, such as glass containing layers 124, 134, 234, 224, 334, 324, 824, 834, 24 and 34. These "layers" can be continuous or discontinuous, meaning that there may be gaps or undulations in the glass containing layers glass containing layers 124, 134, 234, 224, 334, 324, 824, 834, 24 and 34. The glass containing layers 24, 34, 124, 134, 234, 224, 324, 334, 824 and 834 may or may not be needled, stitched, flame bonded and/or adhesive bonded to themselves or to other components of the liner blocks 100, 200, 400, and 850, and liners 300, 500 and 600. Glass-faced flexible fabric layers made in accordance with these teachings are cut to size and, preferably, are joined by stitches 33, 233 or optional stitch 833, which assembles them together as shown in FIGS. 3, 5 and 7A. Optional stitch 833 can be used alternatively or in combination with a heat or resinous bond between the facing flexible fabric layers 218 and 238, or 838 and 818, for example, especially for total thicknesses exceeding about 7 mm. If a relatively thick liner is desired, then adjacent flexible fabric layers 218 and 238 or 838 and 818 are preferably joined to each other by heat or adhesive bonding without stitching or needling, so that the total liner thickness is not limited by the capabilities of stitching or needling equipment. This is described below with reference to FIGS. 7B-10. Alternatively, glass containing layers 24, 34, 124, 134, 234, 324, 334, 824 and 834 can comprise preformed glass mats stitched or needled into the flexible fabric layer, for example. Additionally, instead of two glass containing layers, such as glass containing layers 24 and 34, a single layer, such as a double thickness glass layer, can be applied to one of the flexible fabric layers, such as flexible fabric layer 28, without adding glass fibers to the other, such as flexible fabric layer 18.

Liner or liner block 100 is illustrated to be nearly identical to liner block 200, which contains glass containing layers 124 and 134, and flexible fabric layers 148 and 138. However, since liner or liner block 100 is designed to be the innermost layer, following inversion, a substantially fluid resistant layer 20 is applied. With other liner systems, such fluid impermeable layers were provided by a fluid impermeable foil or "calibration hose" which could be removed or left in place. Some embodiments of the present invention desirably provide thinner flexible fabric layers 35 or 235, such as needled polyester felt layers having a thickness of about 1 to about 3 mm. These flexible fabric layers 35 and 235 preferably contain a first surface, which contains flame-bondable fibers, for bonding to flexible fabric layer 18 and veil 228, for example. They also include a substantially fluid impermeable layer 20, such as a coating, film or saturant, having a thickness of about 0.1 to about 1 mm, so that the final thickness of the plastic-coated fabric is about 1.1 to about 3 mm, preferably about 1.2 to about 1.8 mm. Preferably, the substantially fluid impermeable layer 20 is partially disposed within the porosity of the flexible fabric layers 35 and 235 to form a mechanical or melt bond.

With respect to liner or liner block 100, the flexible fabric 35, containing the substantially fluid impermeable layer 20, is heat bonded, such as by flame tacking, to the flexible fabric layer 18. In like manner, the flexible fabric layer 28 of liner 100 can be flame tacked to the flexible fabric layer 148 to form a melt bond 126. Melt bonds 26 and 126, as well as melt bonds 226 and 326, while strong, are temporary fastening measures, which become less important, or even irrelevant, once the resin is cured.

In the inversion liner blocks 100, 200, 850 and 400, and liners 300, 500 and 600 according to some embodiments of this invention, the glass fiber-containing layers 24, 34, 134, 124, 234, 224, 334, 324, 834 and 824 represent the reinforcement layers and are preferably of a thin cross-sectional thickness, such as less than about 10 mm, preferably about 0.1 to about 5 mm, and most preferably, about 0.6 mm, 1 mm and 1.5 mm for standard 4 mm, 6 mm and 9 mm building blocks, respectively. The flexible fabric layers 18, 28,138,148, 238, 218, 318, 328, 35, 818,838 and 235 are preferably about 0.5 to about 20 mm in thickness each, preferably about 1 to about 10 mm, and most preferably about 1.33 mm, 2 mm and 3 mm for 4 mm, 6 mm, and 9 mm building blocks, respectively. Glass fiber-containing layers 24 and 34 in liner or liner block 100; layers 24, 34 and 124, 134 in composite liner 500; layers 24, 34, 124, 134 and 324, 334 in composite liner 600; and layers 824 and 834 in liner block 850, are desirably located radially outwardly, preferably less than about 5 mm, and more preferably, less than about 2.5 mm, from the outermost fabric-containing layers, prior to inversion, so as to provide flexural modulus and strength to the cured liner or liner blocks. Accordingly, glass fiber-containing layers, such as layers 124 and 134 of composite liner 600 of FIG. 6, can be optionally lightened or eliminated, since they are located along a neutral axis when the laminate if flexed and do not significantly contribute to the flexural performance of the liner 600.

For the glass-faced liner or liner block 300, improved flexural modulus and strength is most desirably accomplished by placing the glass containing layer 224 no more than about 2.5 mm from the liner's surface, and more preferably, within about 1.2 to about 1.8 mm. Thicknesses for the plastic or resin coated flexible fabric layers 35 and 235 should be about 0.1 to about 3.0 mm, preferably about 0.25 to about 2 mm, and more preferably about 0.75 to about 1.25 mm. Additional flexible fabric layers (not shown) can be added, adjacent to layers 218 and 238, or these flexible fabric layers 218 and 238 can be thicker, such as about 10 to about 20 mm, to achieve final fabric thicknesses of up to about 25 to about 44 mm, for example. In addition, the glass fiber containing layers can be about 1-5 mm, preferably about 2-3 mm for thicker liners. The veil 228 should be as thin as possible while still permitting bonding (by heat or other methods) to the next flexible fabric layer. The veil 228 should be permeable to the impregnation resin. The veil 228 may have a thickness of only about 0.01 to about 1 mm, preferably about 0.1-0.3 mm. The impermeable layer itself should be less than about 1 mm thick and, preferably, less than about 0.5 mm thick, and can be applied to the veil 228, the thin flexible fabric layer 235, or directly to the second glass containing layer 224, without any intermediate layers.

The preferred fabric layers 18, 35 and 28 of liner 100; fabric layers 138 and 148 of the second liner 200; fabric layers 238, 218, 228 and 235 of liner block 300; fabric layers 318 and 328 of liner block 400; and fabric layers 818 and 838 of block 850, can be one or more sewn or bonded fabric layers, comprising a natural or synthetic fibrous material in needled, knit, woven or non-woven mat form. Suitable materials should be water and corrosion-resistant. Examples of fibers for such fabrics include pulp fiber, hemp, cotton, polyethylene, polypropylene, rayon, nylon and/or polyester fibers. In certain instances, woven or non-woven glass material can be used in addition to, or as a substitute for, these other fibers. The most preferred embodiment for the fabric layers is a needle-punched non-woven polyester or acrylic felt employing standard technology for manufacturing needle-punched materials.

The high strength fiber-containing layers 24, 34, 124, 134, 234, 324, 224, 324, 334, 824 and 834 of this invention preferably contain chopped glass fibers, glass roving, or both. Glass fiber compositions can include, for example, E, D, R, AR, S and/or C-type glass fibers. Such fibers can be blended with, or replaced by, thermoplastic (such as, polypropylene, polyamide, or polyethylene), or thermosetting, such as polyester, or other materials such as, carbon, graphite or basalt fiber. Although specific examples are described herein in which the high strength fibers are glass, the high strength fibers in all of the examples described herein may be replaced by any of the materials listed in this paragraph, or combinations thereof.

Alternatively, one hundred percent glass fibers can be distributed over the surface of flexible fabric layers 18, 28, 138, 148, 218, 238, 324, 334, 818 and 838, for example, and mechanically bonded thereto to produce a base layer for the liner blocks 100, 200, 400, and 850 and liner 300. This can be accomplished using a light needling process which keeps the majority of the glass fibers properly oriented, or more preferably, a stitch mat process, in which the preferred needle punched polyester mat is stitched to a plurality (about 200-2500 g/m$^2$) of chopped glass fibers on its top surface. The chopped glass fibers may, optionally, be added during production in several stages, which could be stitched down separately (such as in a "double glass" method). For example, up to about 1,000 g/m$^2$ of chopped glass fibers can be applied to a needle punched polyester mat. Then the fabric can be stitched and run through the stitching machine a second time with an additional 1,000 g/m$^2$ of chopped class fibers. These processes result in a fiber glass-coated-polyester substrate laminate. Preferably, unidirectional polymer or glass rovings (750-2,200 tex) can also be provided in the machine direction or cross-machine direction, or in both directions, to allow for the handling of the resulting laminate without significant unintended stretching. Although a uniform application of glass fibers is illustrated in the Figures, the glass fibers can be unevenly distributed on each or some of the fabric layers, or disposed in a double thickness on one fabric layer, such as fabric layer 28, while not applying any fibers to the other fabric layer, such as layer 18, prior to final stitching.

Figure 4:
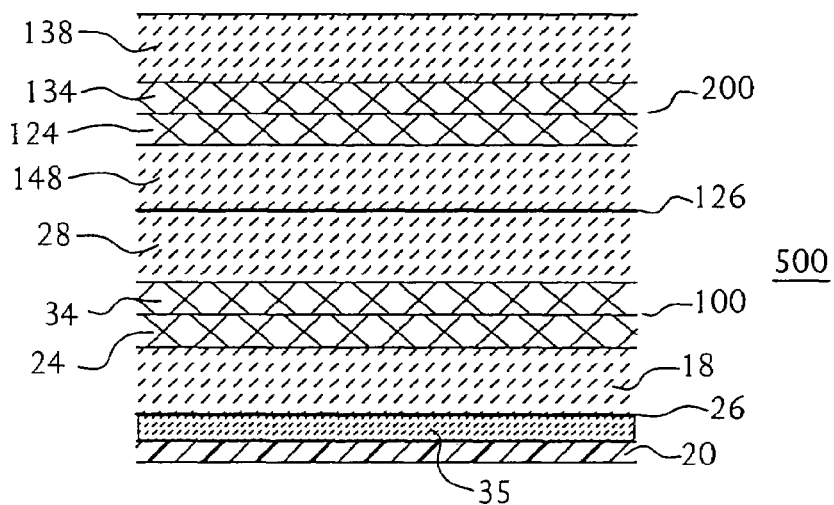
FIG. 4: is an enlarged cross-sectional view of a segment of a composite double-block liner, including the liner of FIG. 3.
Figure 6:
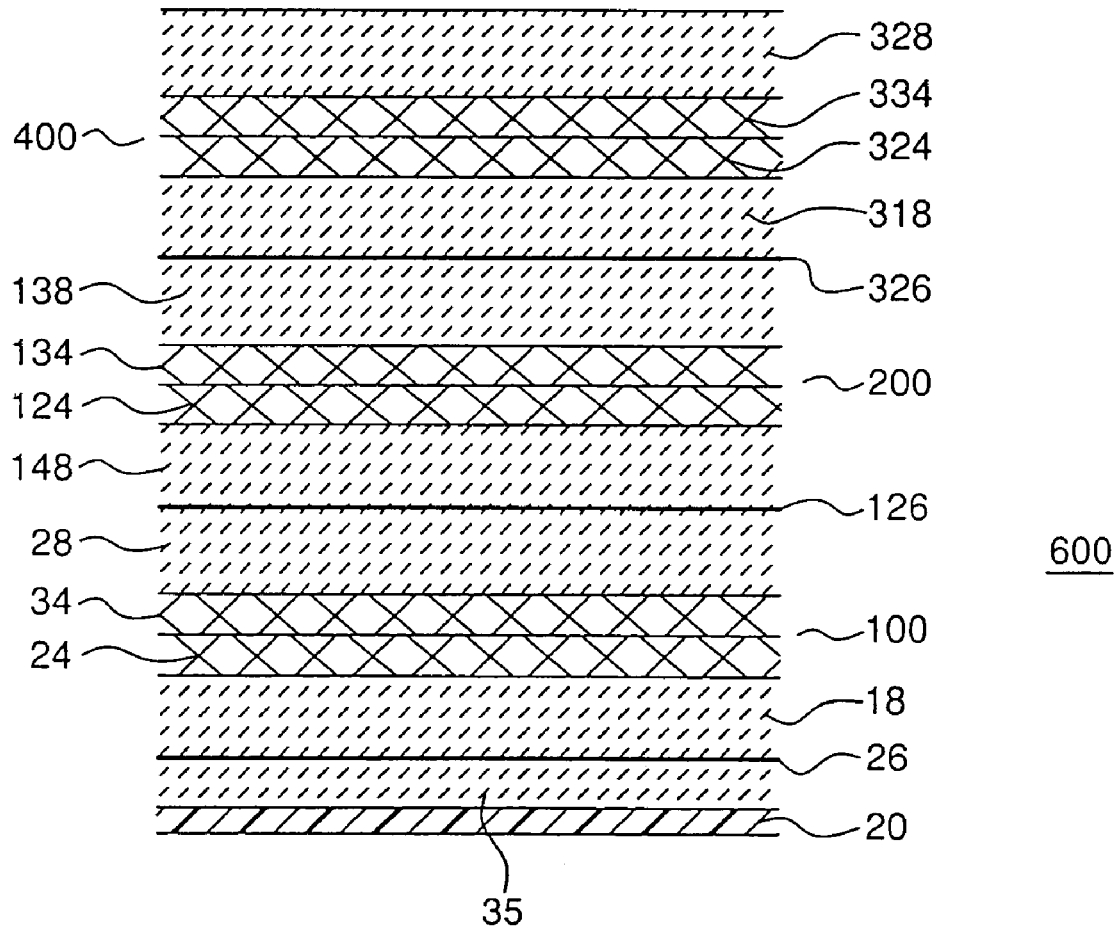
FIG. 6: is an enlarged cross-sectional view of a segment of a composite triple-block liner, including the double-block liner of FIG. 4.

Because of the glass fiber reinforcement, the cured conduit liners of this invention, for example, liners 500 of FIG. 4, 300 of FIG. 5 and 600 of FIG. 6, will have a flexural modulus of at least about 650 ksi and, typically, about 700-800 ksi or more, with a tensile strength of at least about 4,000-9,000 psi. The glass-faced liner 300 of FIG. 5 will have a modulus of about 700-800 ksi or more, due to the outer glass-containing layers 224 and 234 being located at or near the surface. These properties represent a tremendous improvement over cured 100% polyester felt conduit liners, which are known to have a flexural modulus of less than 500 ksi, and commonly about 300-400 ksi. In these forms, some embodiments of this invention use a total of no more than about 5 mm, preferably less than about 1 to about 3 mm of glass, in each of the liner blocks 100, 200, in composite liners 500 and 300, with the balance being polyester or other fabric material. A full thickness 100% glass liner could be used with some additional cost, such as, for example, by using a pair of needled glass felt layers with chopped glass and/or glass roving sandwiched therebetween. Alternatively, the glass component can be limited to the outermost liner blocks only, such as within liner blocks 100 and 400 in composite liner 600. The same would also apply to composite liners having 5, 7 and 9 liner blocks, for example.

In addition, a substantially fluid-impermeable layer 20 or 220, such as a membrane, coating, saturant, film or resinous latex coating, can be provided on fabric layers 35 and 235, and optionally on the innermost surface (prior to inversion) of the liner, such as fabric layers 28 and 138, or on glass-containing layer 234 of liner 300, to prevent fluid leakage and aid in pressurization. In the preferred embodiment, the fabric layers 35 and 235 are (1) painted or coated with a latex saturants such as polyurethane or acrylic, or (2) melt bonded to a polyethylene film, on one side only. In a preferred embodiment, a thin polyester felt of about 0.8 to about 2 mm can be heat bonded to a thermoplastic film of about 0.3 to about 0.6 mm in thickness for a final thickness of about 1.2 to about 2.3 mm.

Figure 7B:
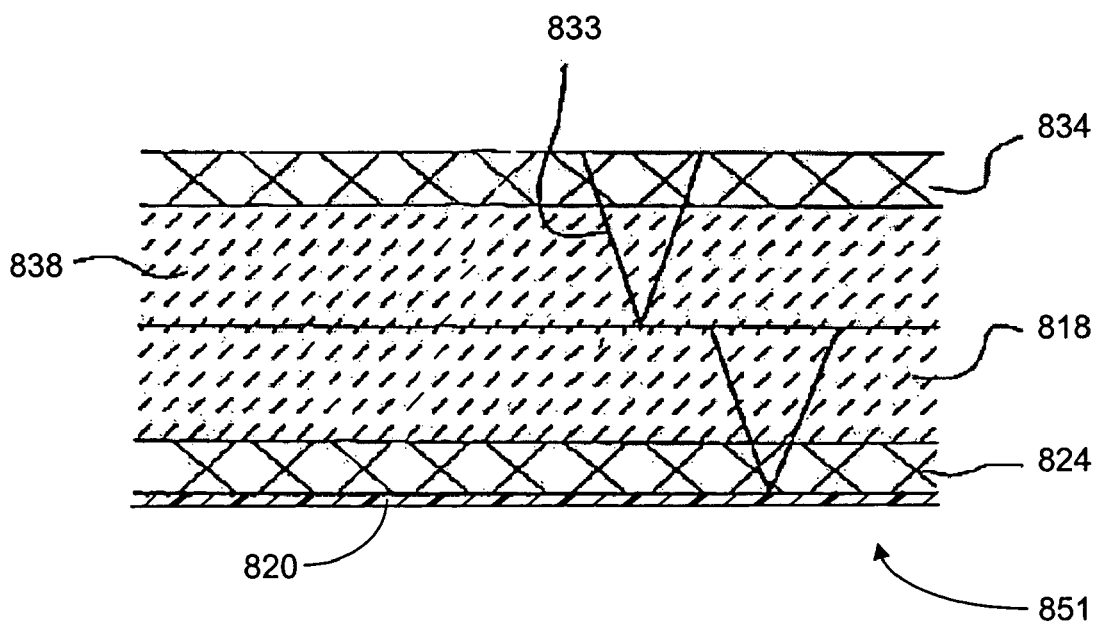
FIG. 7B is a view of a segment of a liner or liner block in which the impermeable layer is directly joined to one of the high strength fiber containing layers.

In accordance with a preferred embodiment of this invention, shown in FIG. 7A, a preferred liner block 850 has been manufactured by applying a substantially fluid impermeable layer 820 to a thin flexible fabric layer or veil 828 by the methods and materials discussed above. The substantially fluid impermeable layer 820 can be applied to the veil 828 and directly to the second glass-fiber containing layer 824. In preparing the liner 300, shown in FIG. 5, a coated polyester felt is typically supplied by an outside vendor, and is heat-bonded to the thin veil 228 by a heat bond 226. FIG. 7B shows a variation of this embodiment, in which the veil 828 is omitted, and the impermeable layer 820 is joined directly to the second flexible fabric layer 824. FIG. 7B also shows that the flexible fabric layers 818 and 838 can be heat or adhesive bonded to each other without stitching or needling.

The present inventors also envision an improved construction method whereby the fabric layer 235 of FIG. 5 can be eliminated. This improved method of manufacturing a tubular inversion liner block 850, includes the steps of providing a first flexible fabric layer 838 fastened to a first glass fiber containing layer 834 and providing a second flexible fabric layer 818 fastened to second glass fiber containing layer 824. The method then combines the first and second flexible fabric layers 838 and 818 and the first and second glass fiber containing layers 834 and 824 so that the first and second flexible fabric layers 838 and 818 face one another and are sandwiched between the first and second glass fiber containing layers 834 and 824. For thicker liners, additional flexible fabric layers can be added to layers 838 and 818, or these layers 838 and 818, and the glass fiber containing layers 834 and 824, can be made thicker, as set forth by way of example, in connection with the description of liner 300. A third flexible fabric layer 828, preferably a thinner flexible fabric of the same or similar material, such as a veil, as described herein, is attached to one of the glass containing layers 824 or 834. In addition, a substantially fluid impermeable layer 820, much like the fluid impermeable layers 20 and 220 defined herein, is joined to the third flexible fabric layer 828 (as shown in FIG. 7A), or directly to one of the glass containing layers 824 or 834 (as shown in FIG. 7B). When the substantially fluid impermeable layer 820 is joined to the third flexible fabric layer 828 (FIG. 7A) or to the second glass fiber containing layer 824 (FIG. 7B) by adhesive, glue, solvent, flame, melt-bond, or stitching, for example, the substantially fluid impermeable layer 820 becomes the outermost layer, and the first or other glass fiber containing layer 834 can become the innermost layer of the inversion liner or liner block 850 prior to inversion. In a preferred embodiment, the substantially fluid impermeable layer 820 is applied by (1) directly coating a plastic film or painting a resinous layer, for example, onto the thin nonwoven veil or layer 828, after it and the other layers of liner block 850 have been stitched together, or (2) by separately applying a plastic film, resinous fluid or latex layer onto the third flexible fabric layer 828 prior to stitching or joining to the remaining layers of the block 850, or (3) by layering a substantially fluid impermeable layer 820 with one of the glass fiber containing layers and flexible fabric layers before they are all stitched together.

In typical fashion, the third flexible fabric layer 828 can be stitched to the second glass fiber containing layer 824 and second flexible fabric layer 818 at the same time the latter two layers are stitched. Alternatively, the third flexible fabric layer 828 could be stitched at the same time as the first and second flexible fabric layers 838 and 818, and their attendant glass fiber containing layers 834 and 824, are stitched together. This practice is more desirable when a total thickness of layers 834, 838, 818, 824 and 820 is less than about 7 mm. Otherwise, it is envisioned that the first and second flexible fabric layers 838 and 818 would, preferably, be heat or resin-bonded, such as disclosed by heat or resin bonds 26, 126 or 326. After heat or resin bonding the flexible fabric layers 838 and 818 together, a coated felt, such as flexible fabric layer 235 of FIG. 5 and its substantially fluid impermeable layer 220, can be heat-bonded to the veil, such as veil 828, in this assembly variation.

For reasons of functionality and aesthetics, a veil or thin flexible fabric layer can also be added to the surface of the first glass containing layer 834, which will eventually become the outermost layer after inversion. This will contain loose fibers from being removed from the liner, which could possibly cause irritation during handling.

Figure 8:
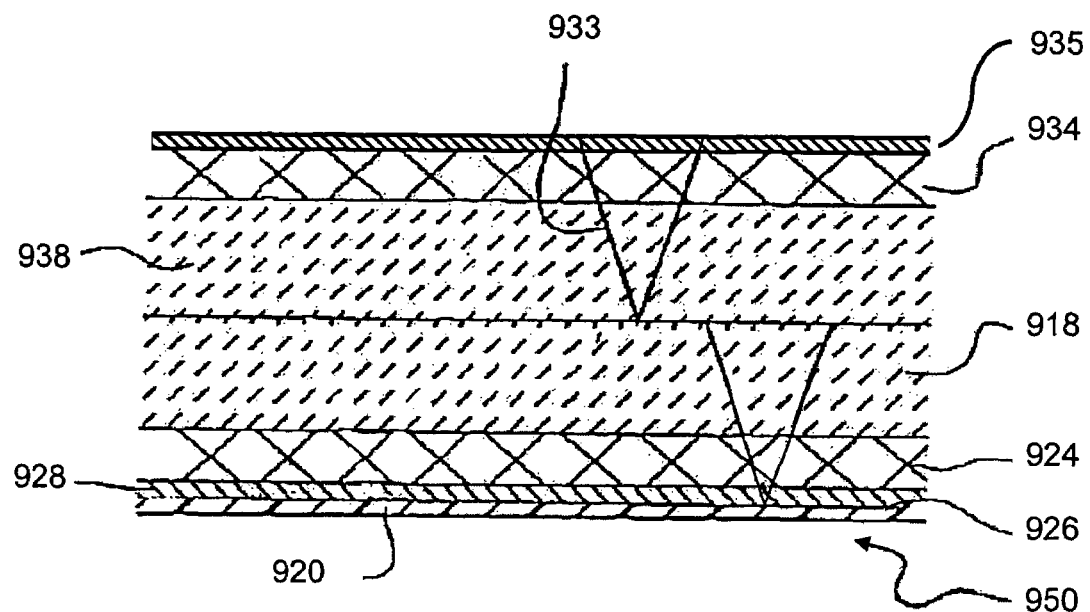
FIG. 8 is a cross-sectional view of another embodiment of a liner in which adjacent flexible fabric layers are heat or adhesive bonded to each other.

For example, FIG. 8 shows an exemplary liner block 950, having a first flexible fabric layer 938 and a first high strength (e.g., glass) fiber containing layer 934 stitched together, and having a second flexible fabric layer 918 and a second high strength (e.g., glass) fiber containing layer 924 stitched together. The first and second flexible fabric layers 938 and 918, are fastened together by melt bonding or adhesion without stitching or needling, whereby the first and second flexible fabric layers 938, 918 face one another and are sandwiched between the first and second fiber containing layers 934, 924. A substantially fluid impermeable layer 920 is joined to at least one of the high strength fiber containing layers 924. In the example shown, a veil 928 is joined to the second glass fiber containing layer 924 and second flexible fabric layer 918 at the same time the latter two layers are stitched. The fluid impermeable layer 920 is joined to the second fiber containing layer 924 by way of attachment to the veil layer 928. The liner block 950 further comprises a another veil layer 935 joined to the other of the first and second high strength fiber containing layers.

In this example, the second veil layer 935 is joined to the first flexible fabric layer 938 and the first high strength fiber containing layer 934 at the same time the latter two layers are stitched. The second veil 935, which is initially on the inside of the liner or liner block 950 protects the glass layer during production handling, and also during inversion.

The substantially fluid impermeable layer 920 may be applied to the veil layer 928 or to the second glass fiber containing layer 924 by any of the methods described above for joining the fluid impermeable layers 20, 220 or 820. For example, adhesive, glue, solvent, flame, melt-bond, may be used. When the substantially fluid impermeable layer 920 is joined, the substantially fluid impermeable layer 920 becomes the outermost layer, and the second veil 935 can become the innermost layer of the inversion liner or liner block 950 prior to inversion.

Although FIG. 8 shows a single liner block or liner having one pair of flexible fabric layers 938, 918 and one pair of high strength fiber containing layers 934, 924, any desired number of liner blocks may be joined in the manner described with reference to FIG. 6, with a fluid impermeable layer as the outermost layer (prior to inversion), and a veil 935 as the innermost layer (prior to inversion).

Figure 9:
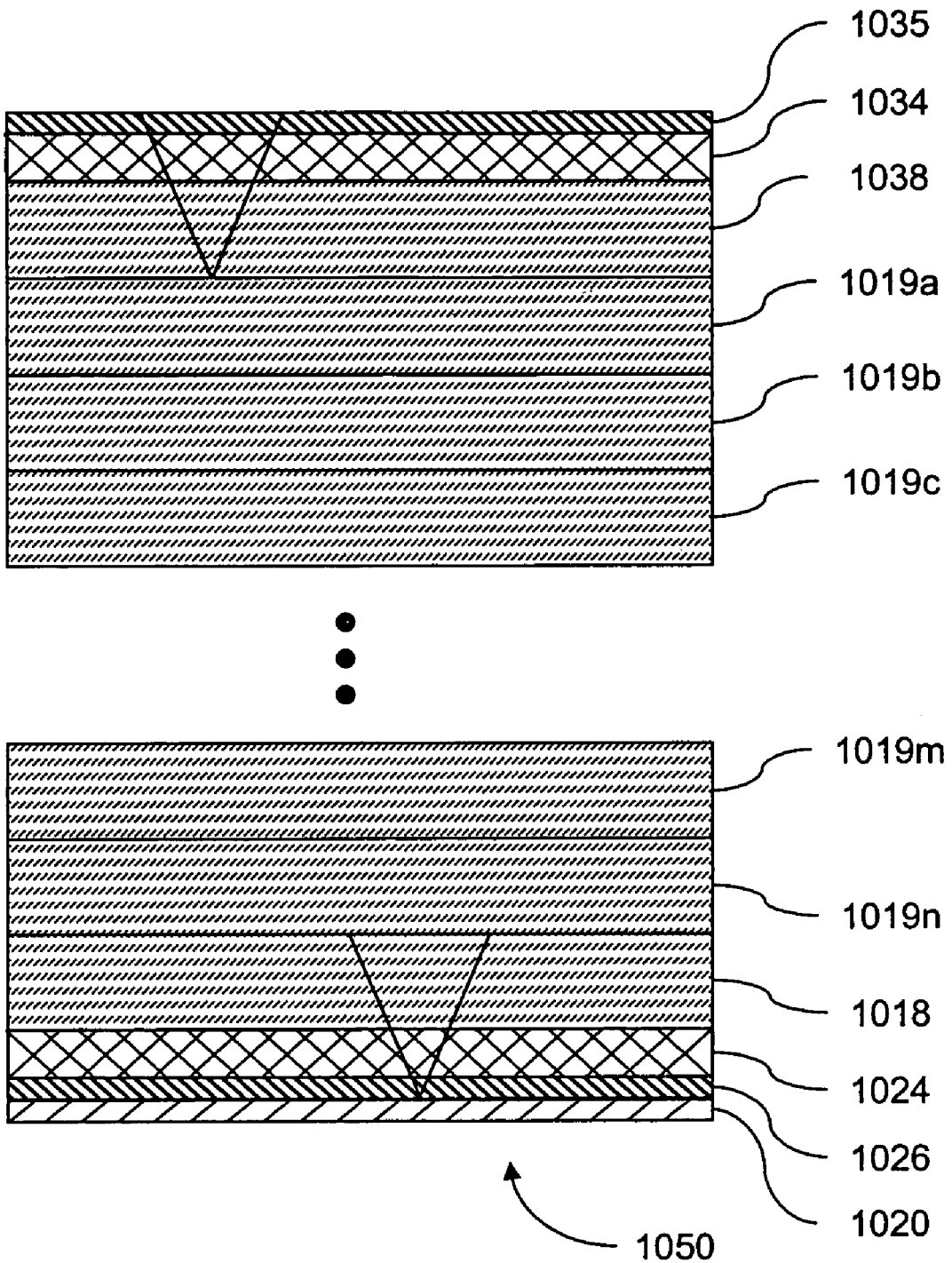
FIG. 9 is a cross sectional view of another embodiment of a liner having additional adjacent flexible fabric layers heat or adhesive bonded to each other.

Alternatively, for thicker liners, in some embodiments, the sequence of layers in the liner, from the innermost to outermost layers (prior to inversion) may be:

V-G-F-(N*F)-F-G-V-I, where V=veil layer (optional), G is a high strength fiber containing layer, F is a flexible fabric layer, N is an integer greater than zero representing the number of additional flexible fabric layers, and I is a fluid impermeable layer. FIG. 9 shows an example of such a configuration. In FIG. 9, the liner 1050 includes a veil layer 1035, a first high strength fiber containing layer 1034, a first flexible fabric layer 1038, a desired number N of additional flexible fabric layers 1019a-n, followed by a flexible fabric layer 1018, a high strength fiber containing layer 1024, a veil layer 1026, and a fluid impermeable layer 1020. The first high strength fiber containing layer 1034 is joined to the first flexible fabric layer 1038 by stitching, needling or the like, and the second high strength fiber containing layer 1024 is joined to the second flexible fabric layer 1018 by stitching, needling or the like. The various adjacent flexible fabric layers 1038, 1019a-n, and 1018 are joined to each other by heat bonding or adhesive, without stitching or needling, permitting the liner to have a desired thickness that is not limited by the capabilities of stitching or needling equipment. The veil layer 1026 and the fluid impermeable layer are joined to the flexible fabric layer 1024 using any of the techniques described above.

Figure 10:
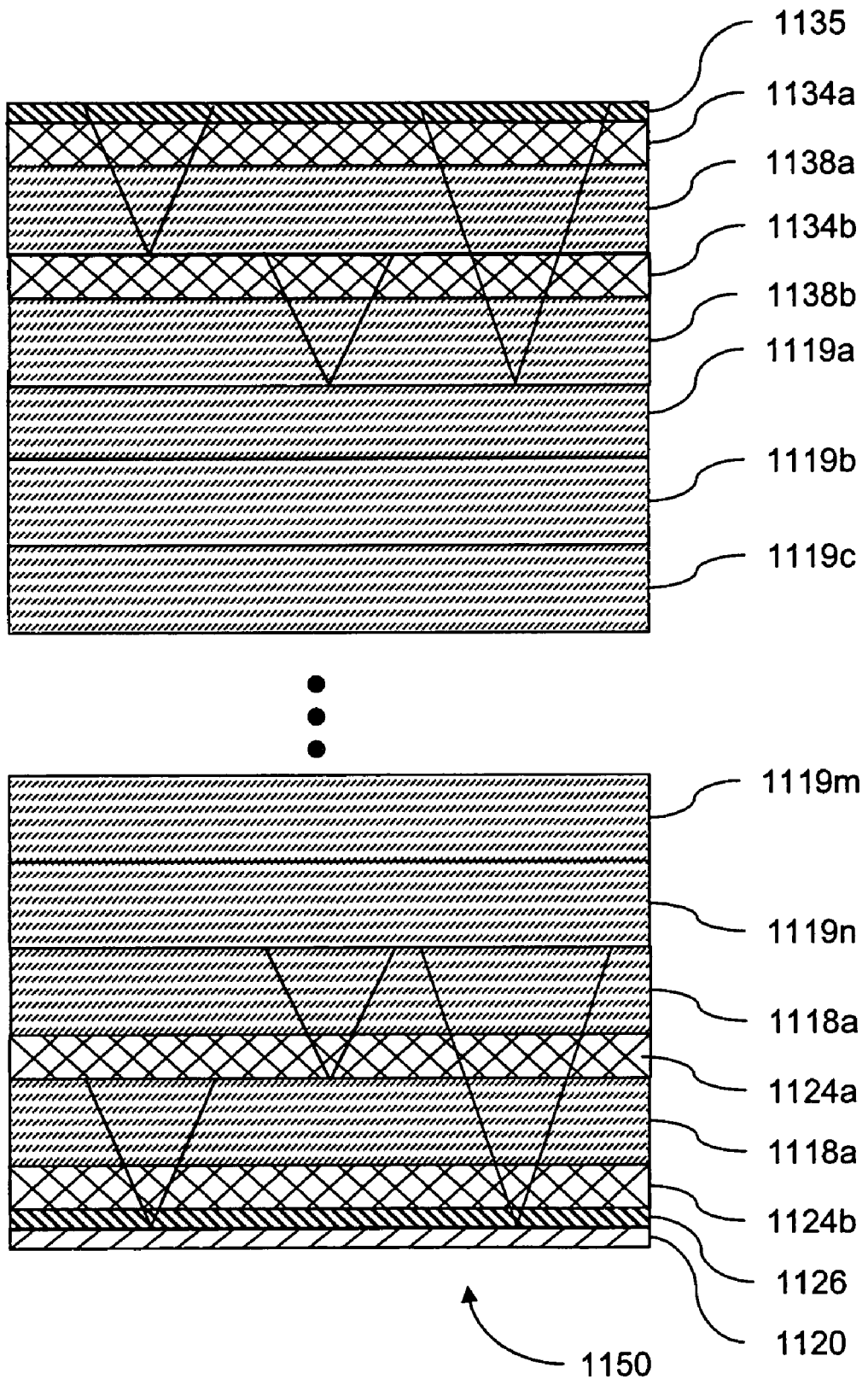
FIG. 10 is a cross sectional view of another embodiment of a liner having alternating glass and felt layers at the interior and exterior of the liner, with additional adjacent flexible fabric layers therebetween.

In other embodiments, for very thick designs, a layer sequence such as:

V-G-F-G-F-(N*F)-F-G-F-G-V-I, may be used, in which each G-F-G-F block may be stitched together, and the one or more F-F bonds between these blocks would be formed with heat or adhesives. FIG. 10 shows an example of such a configuration. In FIG. 10, the liner 1150 includes a veil layer 1135, a first high strength fiber containing layer 1134a, a first flexible fabric layer 1138a, a second high strength fiber containing layer 1134b, a second flexible fabric layer 1138b, a desired number N of additional flexible fabric layers 1119a-n, followed by a third flexible fabric layer 1118a, a third high strength fiber containing layer 1124a, a fourth flexible fabric layer 1118b, a fourth high strength fiber containing layer 1124b, a veil layer 1126, and a fluid impermeable layer 1120. Each high strength fiber containing layer 1134a, 1134b, 1124a, and 1124b is joined to a respective flexible fabric layer 1138a, 1138b, 1118a, and 1118b by stitching, needling or the like. The G-F-G-F blocks can be formed by stitching together two of the stitched assemblies, each containing a flexible fabric layer and its attached high strength fiber containing layer. The various adjacent flexible fabric layers 1138b, 1119a-n, and 1118a are joined to each other by heat bonding or adhesive, without stitching or needling. The veil layer 1126 and the fluid impermeable layer are joined to the flexible fabric layer 1124 using any of the techniques described above.

One of ordinary skill in the art will understand that both the configurations shown in FIG. 9 and FIG. 10 allow the high strength fibers to be concentrated furthest from the neutral axis of the liner material, to maximize the hoop and longitudinal strength provided by a relatively small volume of high strength fibers.

The membrane, film, coating or layer, such as substantially impermeable layers 20, 220 and 820, should be substantially impermeable to fluids, such as air, steam or water, at a pressure of less than 1 atmosphere (15 psi), preferably about 3-5 psi, and temperatures of about 100-260° F. For example, in one exemplary hot water cure system of this invention, the temperature of the water can be cycled up to 180-190° F. More specifically, the heat can be applied from one side, ramped from ambient to 180° F. over 3-4 hours, and held at 140° F. for one-half hour. The exothermic reaction for a thermosetting resin can occur, for example, during the 140° F. hold, and peak at 250-260° F. A temperature of 180° F. is maintained for 3 hours, then the liner is cooled at a rate of no higher than about 15° F. per hour down to about 10° F. over ambient. The substantially impermeable layers 20, 220 and 820 can be attached to a thin flexible fabric layer, such as a veil 228, or attached directly to a thicker flexible fabric layer, such as layers 235 or 18, or directly attached to a glass fiber containing layer, such as layers 224, 24 or 824 (as in FIG. 7B), via adhesive, glue, solvent, flame, melt-bond or stitching for example.

The liners 300, 500 and 600, and blocks 100, 200, 400 and 850 of the present examples of this invention are designed to be impregnated with a curable or settable resin. The resinous impregnation liquid introduced into the fabric layers 18, 28, 35, 138, 148, 218, 238, 228, 235, 838, 818, 318, and/or 328, glass fiber-containing layers 24, 34, 134, 124, 834, 824 and/or 224, or within all or some of these layers, can be any number of thermosetting or thermoplastic compositions which can be introduced by dipping, injecting, extruding or painting, for example. The resinous impregnation liquid becomes set or hardened by light or heat to provide a solid matrix around the fibers. Suitable thermoplastic compositions include thermoplastic polyvinyl chloride, polyolefins, and the like. Suitable thermosetting resins can include those containing a heat-activatable curing agent, a light-activatable agent, a curing agent, or a heat deactivatable curing retarding agent. Such examples include ultraviolet curing unsaturated polyester, such as disclosed in U.S. Pat. No. 6,170,531, incorporated herein by reference, vinyl ester, epoxy and thermosetting polyester.

The liners 300, 500 and 600, and optionally, liner blocks 100, 200, 850 and 400 of the disclosed examples of this invention further include an adhesive, glue, solvent, flame and/or melt bonds 26, 126, 226 and 326. The bonds 26, 126, 226 and 326 preferably include a flame or melt bond between molten fibers of polyester felt or polyolefin fibers, for example. The bonds 26, 126, 226 and 326 preferably "tack" the adjoining layers together so that they can be resin impregnated, inserted into a pipe and inverted under pressure without breaking apart. Curing of the resinous saturant will provide the final bond between fabric and glass layers to provide the final tensile and flexural strength.

With respect to FIG. 1, one procedure for inserting the preferred inversion liner 500 of this invention will now be described. This improved method is designed to repair a crack in a ruptured underground conduit 12, such as pipes, mains or drains. Man holes, when not already present, can be provided on opposite sides of the ruptured pipe sections after the pipe 12 has been suitably emptied and the particular section is uncoupled from adjacent sections. The unexpanded inversion liner 500, containing the composite liner portions 100 and 200 of FIG. 4, is then inserted into the cleaned pipe 12, the free end 11 is then inverted and clamped by fasteners 13 to the feed elbow 22. Hot pressured fluids, such as steam, air or water can be pumped into the liner 500 until it completely inverts and expands. This pressure can remain within the liner 500 until the thermosetting or thermoplastic resin impregnated therein sets or cures. The free end of the liner 500 can then be removed from the elbow 22 and the repaired section of the pipe 12 re-coupled to the adjacent pipe sections. The liners and liner blocks 100, 200, 300, 500, 600 and 850 according to the exemplary embodiments of this invention may also be used with new or undamaged conduit before installation, or can be used to manufacture original equipment piping and conduit, as a liner, or as a stand alone product.

From the foregoing, it can be realized that this invention provides improved inversion liners having reinforced glass (or other high strength) fiber-containing layers for improving the hoop and longitudinal strength of the liner material, while providing a heat or light-activatable saturant for curing. Although various embodiments have been illustrated, this is for the purpose of describing, but not limiting the invention. Various modifications, which will become apparent to one skilled in the art, are within the scope of this invention described in the attached claims and equivalents thereof.

What is claimed:

1. A method of making a tubular inversion liner or liner block, comprising:
   a) providing a first flexible fabric layer stitched to a first high strength fiber containing layer;
   b) providing a second flexible fabric layer stitched to a second high strength fiber containing layer;
   c) combining said first and second flexible fabric layers and said first and second high strength fiber containing layers by melt bonding or adhesion without stitching or needling the first and second flexible fabric layers to each other, whereby said first and second flexible fabric layers face one another, and are sandwiched between said first and second high strength fiber containing layers; and
   d) providing a substantially fluid impermeable layer on said second high strength fiber containing layer to form a tubular inversion liner having a total thickness of about 12 to 50 mm.

2. The method of claim 1 wherein said first and second flexible fabric layers comprise a nonwoven polyester felt.

3. The method of claim 1 wherein said first and second high strength fiber layers comprise at least one of the group consisting of chopped glass fibers and glass roving.

4. The tubular inversion liner of claim 1 wherein said substantially fluid impermeable layer comprises one of a resinous membrane or a resinous coating.

5. The tubular inversion liner of claim 4 wherein said substantially fluid impermeable layer further comprises a veil to which the resinous membrane or resin coating is applied.

6. The method of claim 4 wherein said fluid impermeable layer comprises a polyurethane coating which is adhered to a first surface portion of one or both of said high strength fiber containing layers.

7. The method of claim 6, wherein said fluid impermeable layer has a thickness of about 0.3 to about 0.6 mm.

8. The method of claim 1 wherein said liner is impregnated with a heat curable or light curable resin, and cured to produce a flexural modulus of at least about 650 ksi.

9. The method of claim 1 comprising an additional flexible fabric layer, high strength fiber containing layer, or both, disposed between said first and second flexible fabric layers.

10. The method of claim 1 wherein said liner is an inversion liner and said substantially fluid impermeable layer becomes the outermost layer prior to inversion, and the innermost layer following inversion.

11. The method of claim 1, further comprising one or more further flexible fabric layers between the first and second flexible fabric layers, the further flexible fabric layers having a thickness of about 10 mm to about 20 mm.

12. A method of making a tubular inversion liner or liner block, comprising:
   a) providing a first flexible fabric layer stitched to a first high strength fiber containing layer;
   b) providing a second flexible fabric layer stitched to a second high strength fiber containing layer, the second high strength fiber containing layer including chopped fibers and rovings;
   c) combining said first and second flexible fabric layers and said first and second high strength fiber containing layers by melt bonding or adhesion without stitching or needling the first and second flexible fabric layers to each other, whereby said first and second flexible fabric layers face one another, and are sandwiched between said first and second high strength fiber containing layers;
   d) joining a veil to the second high strength fiber containing layer, the veil being thinner than the first and second flexible fabric layers;
   e) providing a substantially fluid impermeable layer on said veil, wherein said fluid impermeable layer comprises a polymer film directly bonded to the veil.

13. The method of claim 12 further comprising joining a second veil to the first high strength fiber containing layer.

14. The method of claim 12, wherein the liner has a total thickness of about 12 mm to about 50 mm.

15. The method of claim 12, wherein the liner block has a thickness of about 9 mm.

16. A pressure-expandable tubular liner for conduits, including at least one liner block, comprising:
   a first flexible fabric layer stitched to a first high strength fiber containing layer;
   a second flexible fabric layer stitched to a second high strength fiber containing layer;
   said first and second flexible fabric layers and said first and second high strength fiber containing layers fastened together by melt bonding or adhesion without stitching or needling the first and second flexible fabric layers to each other, whereby said first and second flexible fabric layers face one another and are sandwiched between said first and second fiber containing layers; and
   a substantially fluid impermeable layer joined to at least one of said high strength fiber containing layers to form a tubular inversion liner having a total thickness of about 12 to 50 mm.

17. The tubular inversion liner of claim 16, wherein said first and second flexible fabric layers comprise a nonwoven polyester felt.

18. The tubular inversion liner of claim 17, wherein said first and second high strength fiber layers comprise at least one of the group consisting of chopped glass fibers and glass roving.

19. The tubular inversion liner of claim 16, wherein said substantially fluid impermeable layer comprises one of a resinous membrane or a resinous coating.

20. The tubular inversion liner of claim 19 wherein said substantially fluid impermeable layer further comprises a veil to which the resinous membrane or resin coating is applied.

21. The tubular inversion liner of claim 16, wherein said fluid impermeable layer comprises a polyurethane coating which is adhered to a first surface portion of one or both of said high strength fiber containing layers.

22. The tubular inversion liner of claim 16, wherein said fluid impermeable layer comprises a polymer film integrally bonded to a felt, veil or both.

23. The method of claim 22, wherein said veil has a thickness of from about 0.1 mm about 1.0 mm.

24. The method of claim 22, wherein said veil has a thickness of from about 0.1 to about 1.0 mm.

25. The method of claim 16, wherein said substantially fluid impermeable layer comprises a polyurethane or acrylic latex coating, or a melt-bonded polyolefin film.

26. The tubular inversion liner of claim 16 wherein said liner is impregnated with a heat curable or light curable resin, and cured to produce a flexural modulus of at least about 650 ksi.

27. The tubular inversion liner of claim 16 comprising an additional flexible fabric layer, high strength fiber containing layer, or both, disposed between said first and second flexible fabric layers.

28. The tubular liner of claim 16 wherein said liner is an inversion liner and said substantially fluid impermeable layer becomes the outermost layer prior to inversion, and the innermost layer following inversion.

29. The liner of claim 16, wherein the liner block has a thickness of about 9 mm.

30. The liner of claim 16, further comprising a further flexible fabric layer between the first and second flexible fabric layers, the further flexible fabric layer having a thickness of from about 10 mm to about 20 mm.

31. The tubular inversion liner of claim 16, further comprising a veil layer joined to the other of said high strength fiber containing layers.

32. A pressure-expandable tubular liner for conduits, comprising:
   a first flexible fabric layer stitched to a first high strength fiber containing layer;
   a second flexible fabric layer stitched to a second high strength fiber containing layer;
   one or more additional flexible fabric layers, each of the additional flexible fabric layers joined to one of the group consisting of the first flexible fabric layer, the second flexible fabric layer, and another of the one or more additional flexible fabric layers by melt bonding or adhesion without stitching or needling the first and second flexible fabric layers to each other, whereby said one or more additional flexible fabric layers are sandwiched between said first and second high strength fiber containing layers; and
   a substantially fluid impermeable layer joined to at least one of said first and second high strength fiber containing layers to form a tubular inversion liner having a total thickness of about 12 to 50 mm.

33. The liner of claim 32, further comprising a thin felt or veil layer sandwiched between the second high strength fiber containing layer and the substantially fluid impermeable layer.

34. The liner of claim 32, further comprising a thin felt or veil layer joined to the first high strength fiber containing layer.

35. The liner of claim 32, further comprising:
a third flexible fabric layer fastened to a third high strength fiber containing layer and joined between the first flexible fabric layer and the additional flexible fabric layers; and
a fourth flexible fabric layer fastened to a fourth high strength fiber containing layer and joined between the second flexible fabric layer and the additional flexible fabric layers.

36. The liner of claim 32, further comprising:
a first thin felt or veil layer sandwiched between the second fiber containing layer and the substantially fluid impermeable layer;
a second thin felt or veil layer joined to the first fiber containing layer;
a third flexible fabric layer fastened to a third high strength fiber containing layer and joined between the first flexible fabric layer and the additional flexible fabric layers; and
a fourth flexible fabric layer fastened to a fourth high strength fiber containing layer and joined between the second flexible fabric layer and the additional flexible fabric layers,
wherein the one or more additional flexible fabric layer includes a plurality of adjacent additional flexible fabric layers joined to each other by melt bonding or adhesion without stitching or needling the adjacent additional flexible fabric layers to each other.

* * * * *